(No Model.) 2 Sheets—Sheet 1.

J. G. TRUMP.
CULTIVATOR.

No. 396,627. Patented Jan. 22, 1889.

WITNESSES,
T. Walter Fowler
W. H. Patterson

INVENTOR,
John G. Trump,
by A. H. Evans & Co
his Attorneys.

(No Model.) 2 Sheets—Sheet 2.

J. G. TRUMP.
CULTIVATOR.

No. 396,627. Patented Jan. 22, 1889.

WITNESSES
S. Walter Fowler
W. H. Patterson

INVENTOR.
John G. Trump,
by A. H. Evans & Co
Attorney

UNITED STATES PATENT OFFICE.

JOHN G. TRUMP, OF RICHVILLE, MICHIGAN.

CULTIVATOR.

SPECIFICATION forming part of Letters Patent No. 396,627, dated January 22, 1889.

Application filed October 31, 1888. Serial No. 289,590. (No model.)

*To all whom it may concern:*

Be it known that I, JOHN G. TRUMP, a citizen of the United States, residing at Richville, in the county of Tuscola and State of Michigan, have invented certain new and useful Improvements in Cultivators, of which the following is a full and clear description, reference being had to the accompanying drawings, forming part of this specification, in which—

Figure 1:
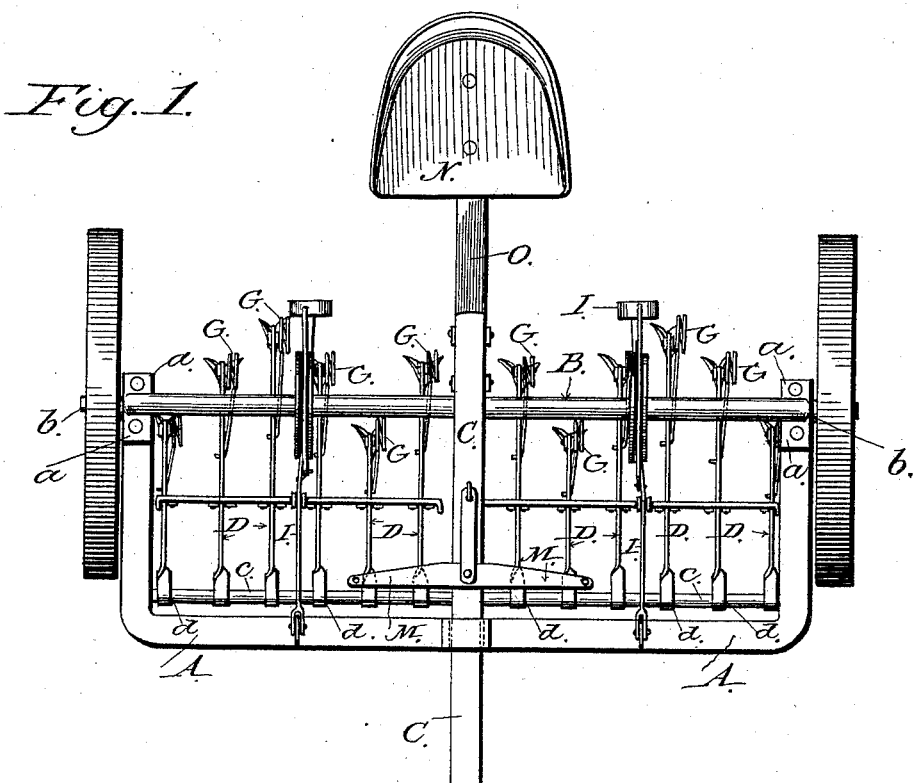
Figure 4:
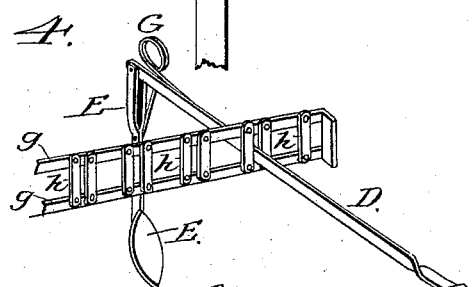
Figure 5:
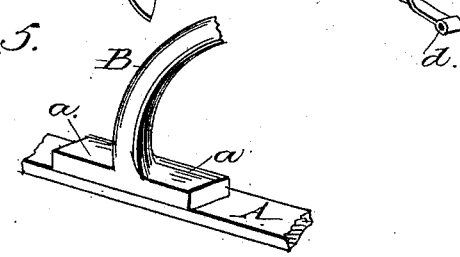
Figure 2:
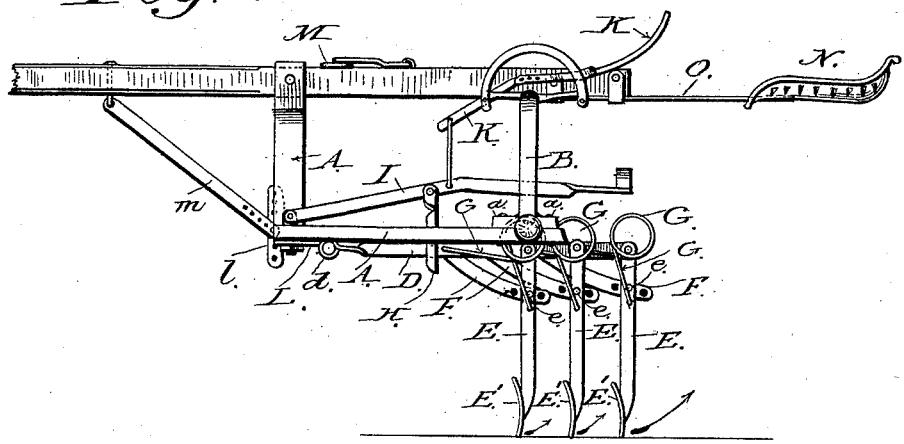
Figure 3:
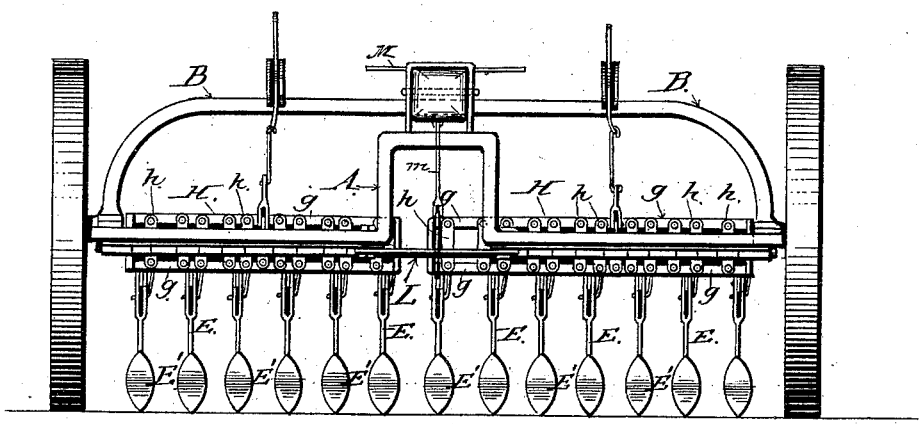

Figure 1 represents a plan view of a cultivator having my improvements attached. Fig. 2 is a side elevation of the same, showing one of the bearing-wheels removed. Fig. 3 is a front view. Figs. 4 and 5 are details to be referred to.

My invention relates more particularly to that class of agricultural machines known as "two-horse cultivators," and it is an improvement on my former patent, No. 343,401, granted to me May 25, 1886; and it consists in the constructions and combinations of devices which I shall hereinafter fully describe and claim.

To enable others skilled in the art to make and use my invention, I will now describe the same and indicate the manner in which I have carried it out.

In the said drawings, A represents the frame of the cultivator, and B represents a curved axle elevated above (or below) the rear of the machine, whereby it is adapted to support the rear end of the pole or tongue C, the said tongue being also supported upon the arched front end of the main frame, as shown and described in my said former patent. The ends of the axle are curved downwardly and provided with forwardly and rearwardly extending plates or portions $a$, which are bolted to the side bars of the main frame, the said ends being also formed with outwardly-extending pintles $b$, upon which the main bearing-wheels are mounted.

In the front under portion of the main frame are secured rods or bars $c$, which carry the drag-bars D, the said bars being arranged, preferably, in "gangs," and elevated and lowered by any well-known mechanism, but preferably that which I shall hereinafter indicate. The drag-bars in the present case consist of single bars, the front ends of which are formed with quarter-twists and provided with eyes $d$, through which the rods $c$ are passed, whereby said drag-bars may have a free pivoted movement on said rods. To the rear ends of the drag-bars the standards E are pivotally secured, and said standards have forked upper ends and carry at their lower ends any well-known form of shovel, E'.

Braces F are secured at their front ends to the drag-bars, while their rear ends are passed through the forked ends of the standards, being secured therein by breaking-pins $e$, whereby, when the shovels meet an obstruction too large to pass between them or too heavy to be moved successfully by the machine, the breaking-pins are ruptured and the standards are permitted to swing backward far enough to allow the obstruction to pass beneath them. To return the standards and shovels to their normal positions, I introduce between each standard and its drag-bar a spring, G, one end of which is secured to the drag-bar, and then extended backward and formed with one or more coils, after which it is extended downward and its opposite end secured to the shovel-standard at a point below the breaking-pin, whereby, when said pin is ruptured and the standard forced backward, the spring exerts its power to return the standard to its former position. The said spring can also be used without the pin in rough lands. The drag-bars of each gang are connected with each other by means of a yoke, H, which consists of longitudinal top and bottom bars $g$ and vertical spaced bars $h$, arranged in pairs, and between which the drag-bars are passed, the said yokes being also secured to the foot-lever I, pivoted to the front of the main frame, and having a link-connection with the operating hand-lever K, by means of which the drag-bars are raised and lowered in the usual manner. By this construction I am enabled to use single drag-bars, and yet so arrange them between the vertical plates that side strain and motion are dispensed with. The plate L, which occupies the space immediately under the arched front portion of the main frame, and which carries the middle drag-bars, is provided with a vertical projection, $l$, above and below said plate, and this projection is formed or connected with a brace, $m$, which extends upward and forward, and is connected with the under side of the tongue, as shown in Fig. 2. This construction enables me to provide high or low draft for the different kinds of cultivation, while at the same time, by removably securing the central plate and its drag-bars, this lower draft attachment may be removed, when the machine may be used for cultivating corn.

As before stated, the tongue or pole is elevated some distance above the drag-bars, and the doubletree M is secured to the top of the tongue or pole, where it will be out of the way in cultivating high corn.

The seat N in the present case is provided with a spring-standard, O, which is passed beneath the tongue and removably secured to the under side of the tongue by plates or clips in any well-known manner.

Having thus described my invention, what I claim as new, and desire to secure by Letters Patent, is—

1. The main frame, the arched axle, the drag-bars, and the forked shovel-standards, in combination with the braces pivoted to said drag-bars and passed through the forked ends of the standards, breaking-pins securing said braces to the standards, and coiled springs having one end secured to the drag-bars and the opposite end secured to the standards below the breaking-pins, substantially as herein described.

2. In a cultivator, the main frame having the arched front portion, the arched axle secured to said frame at its rear, and the drag-bars and attachments, in combination with the removably-secured plate, to which the central drag-bars are attached, a draft attachment extending above and below said plate, and a brace extending from the draft attachment to the pole or tongue, substantially as herein described.

3. In a cultivator, the combination, with the main frame, the main axle and bearing-wheels, and the drag-bars and attachments, of the pole or tongue and the seat having a spring-standard removably secured beneath the rear end of the pole or tongue, substantially as herein described.

4. In a cultivator, the main frame, the main axle and bearing-wheels, and the drag-bars and attachments, in combination with the yokes H, consisting of the upper and lower longitudinal bars $g$ and the vertical uniting-bars $h$, arranged in pairs and separated from each other to permit the passage of the drag-bars, substantially as and for the purpose specified.

JOHN G. TRUMP.

Witnesses:
 ROBERT V. BRAY,
 P. H. BANNING.